United States Patent
Ratasuk et al.

(10) Patent No.: US 7,145,891 B2
(45) Date of Patent: Dec. 5, 2006

(54) METHOD AND APPARATUS TO PROVIDE DESIRED QUALITY-OF-SERVICE LEVELS TO MULTIPLE COMMUNICATION SERVICES

(75) Inventors: Rapeepat Ratasuk, Schaumburg, IL (US); Amitava Ghosh, Buffalo Grove, IL (US); Michael M. Wang, Hawthorn Woods, IL (US); Weimin Xiao, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/629,408

(22) Filed: Jul. 29, 2003

(65) Prior Publication Data

US 2005/0025109 A1  Feb. 3, 2005

(51) Int. Cl.
 *H04B 7/216* (2006.01)
(52) U.S. Cl. .................. 370/335; 370/252
(58) Field of Classification Search ........ 370/311, 370/329, 335, 342, 338, 468, 252
 See application file for complete search history.

(56) References Cited

U.S. PATENT DOCUMENTS

| | | | | |
|---|---|---|---|---|
| 6,278,701 B1* | 8/2001 | Ayyagari et al. | ......... | 370/335 |
| 6,473,442 B1* | 10/2002 | Lundsjo et al. | ......... | 370/537 |
| 6,744,744 B1* | 6/2004 | Tong et al. | ......... | 370/320 |
| 2002/0054578 A1* | 5/2002 | Zhang et al. | ......... | 370/328 |
| 2002/0075831 A1* | 6/2002 | Lozano | ......... | 370/335 |
| 2002/0102983 A1* | 8/2002 | Furuskar et al. | ......... | 455/452 |
| 2003/0112784 A1* | 6/2003 | Lohtia et al. | ......... | 370/342 |
| 2004/0082301 A1* | 4/2004 | Agin | ......... | 455/127.1 |

OTHER PUBLICATIONS

3rd Generation Partnership Project; Technical Specification Group Radio Access Network; Multiplexing and Channel Coding (FDD) (Release 1999), 3GPP TS 25.212 v3.10.0 (Jun. 2002), 62 pp.

Sohn, Insoo and Bang, Seung Chan, "Performance Studies of Rate Matching for WCDMA Mobile Receiver", IEEE Vehicular Technology Conference, vol. 6, © 2000 IEEE, pp. 2661-2665.

Baey, Sébastien, Dumas, Marcel, and Dumas, Marie-Claude, "QoS Tuning and Resource Sharing for UMTS WCDMA Multiservice Mobile", IEEE Transactions on Mobile Computing, vol. 1, No. 3, Jul.-Sep. 2002, pp. 221-235.

Ratasuk, Rapeepat and Ghosh, Amitava, "Performance Analysis of Time-Multiplexed Services for UMTS W-CDMA Reverse Link", 56th IEEE Vehicular Technology Conference, vol. 3, © 2002 IEEE, pp. 1607-1611.

* cited by examiner

*Primary Examiner*—Huy D. Vu
*Assistant Examiner*—Christine Ng

(57) ABSTRACT

Quality-of-service for different communication services that share a common physical link (such as at least one code division multiplexing code) is provided. Outer power loop control serves to maintain quality-of-service for a selected one of the communication services that has, in a preferred embodiment, a highest relative requirement for quality-of-service. Rate matching parameters are then selected independent of transmission energy factors to ensure that the remaining communication services abide by their corresponding quality-of-service requirements.

23 Claims, 3 Drawing Sheets

METHOD AND APPARATUS TO PROVIDE DESIRED QUALITY-OF-SERVICE LEVELS TO MULTIPLE COMMUNICATION SERVICES

TECHNICAL FIELD

This invention relates generally to quality-of-service for communication services, and particularly to multiple communication services that share a physical connection.

BACKGROUND

Multiple communication services that share a common physical connection are known. For example, proposed third generation cellular telephone systems purport to offer two or more different services that, while different and otherwise independent from one another, nevertheless share at least some aspect of a physical connection. For example, multiple communication services (such as, for example, a voice service and a packet data service) can be transmitted using at least one shared code division multiplexing code in a code division multiple access (CDMA) system. Multiplexing in this fashion offers numerous benefits for both system operators and end users.

Mechanisms to adjust a minimal level of quality-of-service are also known, including processes by which a minimal level of quality-of-service can be provided for a communication service that is multiplexed as suggested above. For example, outer loop power control can be utilized to influence and hence control one or more frame error rates (including, for example, service frame error rates) to thereby achieve a minimal quality-of-service for a given communication service. For example, a relatively low frame error rate (such as 1%) can be provided to support a voice service and a higher frame error rate (such as 10%) can be provided to support a packet data service.

Unfortunately, although it may be desired to provide varying minimal quality-of-service levels for each of many multiplexed services, such prior techniques are relatively one dimensional in this regard. For example, if the frame error rate for a given transmission is set for 5% to accommodate a given packet data communication service, this quality-of-service may be inadequate for a voice service communication that is multiplexed with the packet data information. Similarly, if the frame error rate for a given transmission is set for 1% to accommodate a given voice service communication, this relatively high quality-of-service level may exceed requirements for a co-transmitted packet data service communication and hence effectively lead to a mis-allocation of system communication resources.

BRIEF DESCRIPTION OF THE DRAWINGS

The above needs are at least partially met through provision of a method and apparatus to provide desired quality-of-service levels to multiple communication services set forth in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, at least two communication services to be transmitted (using at least one code division multiplexing code) are provided, wherein at least a first communication service is to be preferably transmitted pursuant to a first level of quality-of-service and a second communication service is to be preferably transmitted pursuant to a second quality-of-service level. One of these services is selected and the level of quality-of-service that corresponds to that selected service is used to govern outer loop power control during transmission of the communication services. In a preferred embodiment, rate matching parameters for each of the communication services are then selected substantially independently of transmission energy factors.

So configured, the outer loop power control mechanism serves to assure a minimal quality-of-service level for the selected communication service and the rate matching parameter (or parameters) then serves to permit an adjustment in the resultant quality-of-service for one or more additional communication services. As a result, different quality-of-service levels are reliably and effectively provided for multiple communication services notwithstanding that such multiple communication services share some common physical connection such as a shared code division multiplexing code.

In a preferred embodiment frame error rate information serves to characterize the quality-of-service levels. If desired, such rate matching parameter calculations can be done during the course of an on-going transmission to thereby effect a dynamic achievement of a given quality-of-service level (or levels) for multiple communication services and/or the dynamic alteration of one or more minimal quality-of-service target levels.

Figure 1:
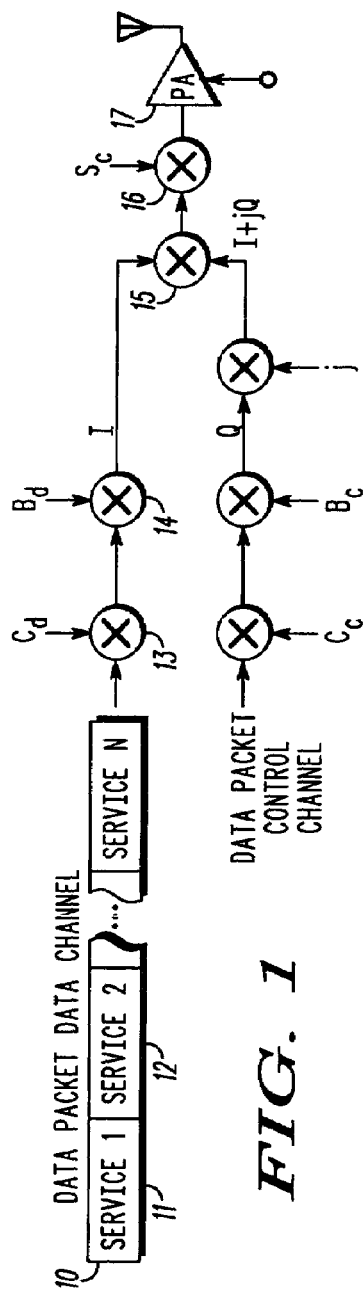
FIG. 1 comprises a schematic depiction of communication services multiplexing and processing as configured in accordance with an embodiment of the invention.

Referring now to FIG. 1, a 3rd generation universal mobile telecommunications system (UMTS) wideband CDMA system comprises a helpful paradigm to aid in illustrating various embodiments. Such systems provide a data packet data channel that comprises a sequentially transmitted plurality of service frames 10. A service frame 10 is often comprised of a flexible number of transport channels such as a first transport channel 11, a second transport channel 12, and so on. The system dynamically allocates these transport channels to support one or more communication services (such as, but not limited to, one or more voice services, one or more packet data services, and so forth) and further dynamically adjusts the size of each such transport channel to better accommodate such competing needs and available system resources.

This data packet data channel is modulated 13 with a channelization code $C_d$ (such as an Orthogonal Variable Spreading Factor (OVSF) code) as may be assigned to this user to facilitate separating and distinguishing different dedicated channels for such a user. The relative power level $\beta_d$ to be accorded the data packet data channel is then established 14 with the power-level adjusted result then being combined 15 with a data packet control channel. The combined I+jQ result is then modulated 16 with a scrambling code $S_c$ (to separate and distinguish, for example, one user from another) following which an adjustable gain power amplifier 17 amplifies the signal for transmission. As is well understood in the art, the gain of this power amplifier 17 is adjusted to effect both inner-loop and outer-loop power control. In particular, power control commands as transmitted by a receiving base station are utilized to control the gain of this power amplifier 17 accordingly.

In general the above actions and steps are well known and understood in the art. Therefore, additional detail will not be provided here for the sake of brevity and the preservation of relevant focus. It should also be understood that, though these embodiments are portrayed within the context of a 3rd generation UMTS W-CDMA application as just described, these teachings are likewise applicable in a wide variety of other multi-services communications applications as well.

Figure 2:
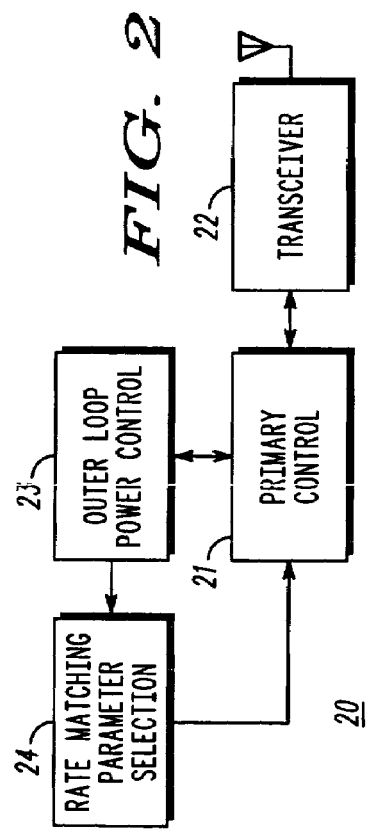
FIG. 2 comprises a block diagram as configured in accordance with various embodiments of the invention.

Referring now to FIG. 2, base station 20 suitable to support these embodiments includes a primary controller 21 that operably couples to a transceiver 22 that communicates with a mobile unit that operates as described above. In a typical embodiment the base station 20 makes the calculations that support the outer loop power control process. An outer loop power controller 23 receives quality-of-service indicators from the primary controller 21 and utilizes this information to change the power amplifier gain of the mobile unit as appropriate. In this embodiment, the base station 20 also includes a rate matching parameter selector 24 that receives quality information from the outer loop power controller 23 and that provides rate matching parameter information to the primary controller 21 such that the latter can also be transmitted to the mobile station for use thereby.

Pursuant to this embodiment, the mobile station has need to transmit, for example, first data that corresponds to a first communication service (such as a packet data service) having a first corresponding desired level of quality-of-service and second data that corresponds to a second communication service (such as a voice service that utilizes vocoding techniques) having a second corresponding desired level of quality-of-service. The first and second desired levels of quality-of-service can be identical to one another or can be considerably divergent. In fact, the mobile unit can have data to transmit in accordance with any number of communication services; only two are noted here for the purposes of simplicity and clarity. In a preferred embodiment, the base station 20 serves in part to select a particular one of the first and second data pursuant to a selection criteria and for purposes that are described in more detail below. This selection can be effected by, for example, the primary controller 21.

The rate matching parameter selector 24 serves to determine a rate matching parameter ratio for the mobile unit to use when determining the relative lengths of the transport channels that will be used to carry the first data and the second data per each service frame. A more detailed discussion of this process appears below.

As described, such a base station 20 can be used to select an outer loop power control parameter to ensure a given level of quality-of-service for a selected communication service and to select a rate matching parameter that at least substantially ensures a given level of quality-of-service for one or more other co-transmitted communication services (wherein the latter quality-of-service may be the same as, or different than, the quality-of-service level that corresponds to the level being maintained by the outer loop power control technique). If desired, as an alternative embodiment, such a platform can be slightly altered to permit subsequent modification of the rate matching parameter (either to effect an intentional change to one or more quality-of-service levels for corresponding communication services and/or to better track with dynamically changing communication pathway conditions). For example, quality information that reflects current (and/or recent) channel and/or reception conditions can be used by the rate matching parameter selector 24 subsequent to the initial selection activity. Such later selected rate matching parameters can then be used by a framer (not shown) to effect a dynamically altered framing process during an extended communication.

While some or all of these activities can be effected through use of dedicated components, in general, most or all can preferably be realized without much in the way of additional hardware. Instead, such actions should, in many cases, be realizable through appropriate programming and configuration of the programmable core engine of the device itself in a manner that is generally well understood in the art.

Figure 3:
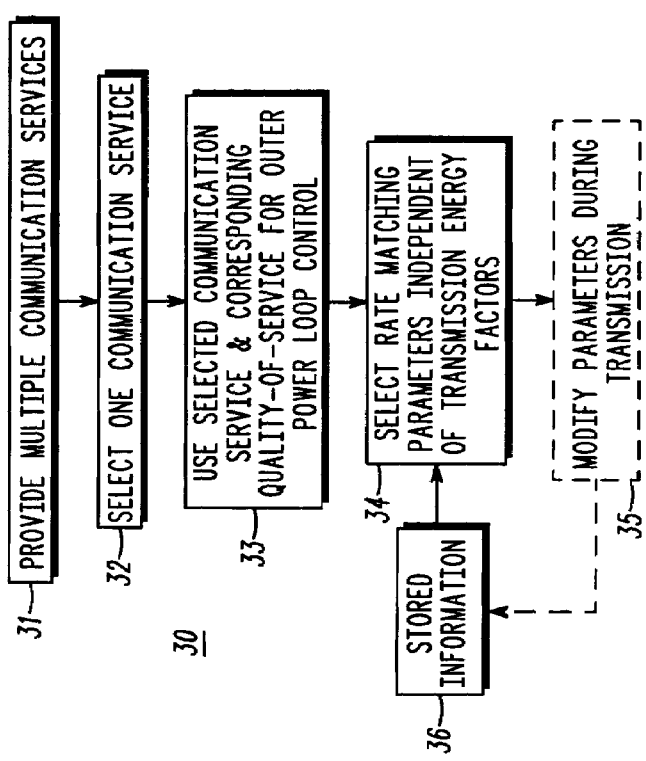
FIG. 3 comprises a flow diagram as configured in accordance with various embodiments of the invention.

Regardless of the particular platform selected to suit the needs of a given application, and referring now to FIG. 3, pursuant to many of these embodiments, the process 30 accommodates provision 31 of multiple communication services. In general, these multiple communication services share a common physical connection. For example, in the illustrative example presented above, two different communication services (such as any of a voice service, a first data service, a second data service, and so forth) are to be transmitted using at least one shared code division multiplexing code in a CDMA wireless communication system. Also, as already noted, these multiple communication services also each have a corresponding preferable level of quality-of-service (it is not necessary, of course, that each of a considerable number of such communication services have a corresponding quality-of-service requirement, so long as at least some of the services have such a requirement). For example, a given communication service may have requirements regarding a minimal level of permitted transmitted data errors (such as, for example, frame error rate information including but not limited to service frame error rates, radio frame error rates, transport channel frame error rates, and so forth).

The process 30 then selects 32 one of the communications services. In a preferred embodiment, the process 30 orders the communications services to thereby identify that communication service having a highest level of quality-of-service as compared to others of the multiple communications services. The process 30 then selects the communication service having the highest level of quality-of-service requirements and uses 33 that quality-of-service requirement to characterize and establish outer loop power control in accordance with any suitable presently known or hereafter-developed methodology. So configured, the process 30 will reliably assure that particular quality-of-service for the corresponding communication service. For example, if a voice service having a 1% maximum permitted frame error rate were the most restrictive quality-of-service requirement amongst a plurality of communication services, the process 30 would preferably select this voice service and use that 1% frame error rate to govern the outer loop power control.

The above actions, of course, will typically not specifically address the quality-of-service requirements of the remaining communication services. Towards that end, the process 30 then selects 34 rate matching parameters substantially independently of transmission energy factors. In a preferred embodiment, this includes selecting a rate matching parameter ratio to be used when allocating transport channel sizes to be used when transmitting the communication services. For example, allocating transport channel sizes can include at least one of increasing a quantity of transmitted symbols as correspond to at least one of the communication services and/or decreasing the quantity of transmitted symbols as correspond to at least one of the communication services. In a preferred approach, determining a rate matching parameter ratio essentially comprises determining a proportional processing gain for at least some of the communication services (where preferably the resultant proportional processing gain is determined for each of the communication services other than the communication service that was originally selected 32 when identifying a particular quality-of-service level to use for outer loop power control). This can be effected, if desired, by combining the proportional processing gain as determined for each of the communication services (other than the initially selected communication service) with a rate matching parameter for the initially selected communication service to derive, for example, a ratio. The latter is then used by the mobile station to facilitate the formation of the transport channels that together comprise a service frame to be transmitted.

As noted earlier, such rate matching parameters can also be adjusted during transmission of the communication services. In a preferred alternative embodiment that accommodates this approach, information that corresponds to channel conditions or characteristics (as reflected, for example, by error rates being measured at a receiving end and as exchanged or otherwise provided via appropriate messages between the transmitter and the receiver) can be used to modify 35 such parameters during transmission. Such modification information can be stored 36 as appropriate and subsequently utilized to determine rate matching parameters to support a subsequent communication session (subsequent, that is, to communication session as was initially supported by the original selection of rate matching parameters).

Figure 4:
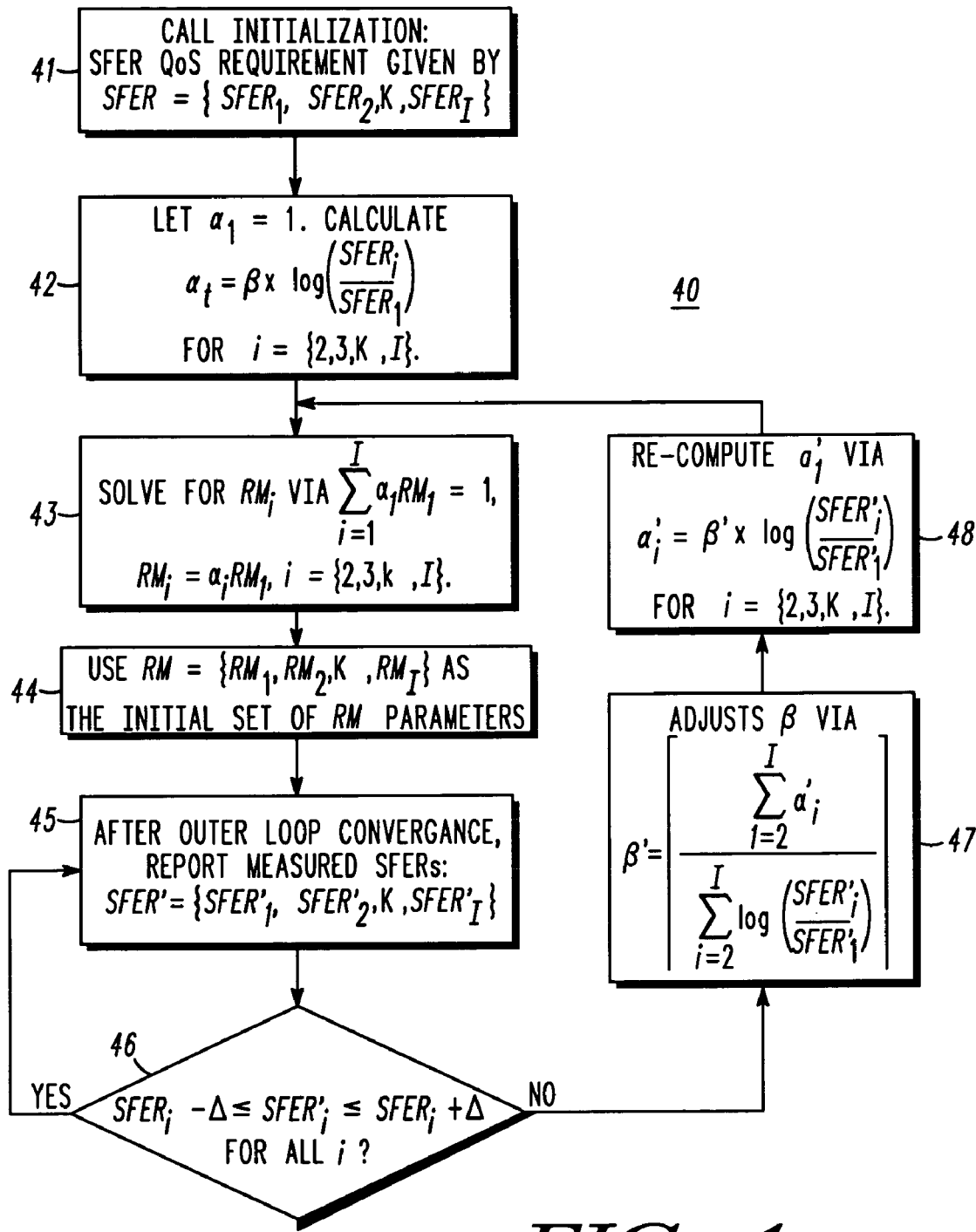
FIG. 4 comprises a detail flow diagram as configured in accordance with an embodiment of the invention.

Referring now to FIG. 4, a more detailed process embodiment 40 will be described to further illustrate these concepts. In this embodiment, we presume that quality-of-service (QoS) relates to service frame error rates (SFER):

$$SFER = \{SFER_1, SFER_2, \ldots, SFER_I\}$$

where I is the number of time-multiplexed services. At call initialization 41, the different services are arranged in ascending order according to their corresponding SFER QoS requirement. This implicitly assumes that the lower the SFER requirement the more important the service (other comparison could of course be utilized to reflect other circumstances or preferences).

Figure 5:
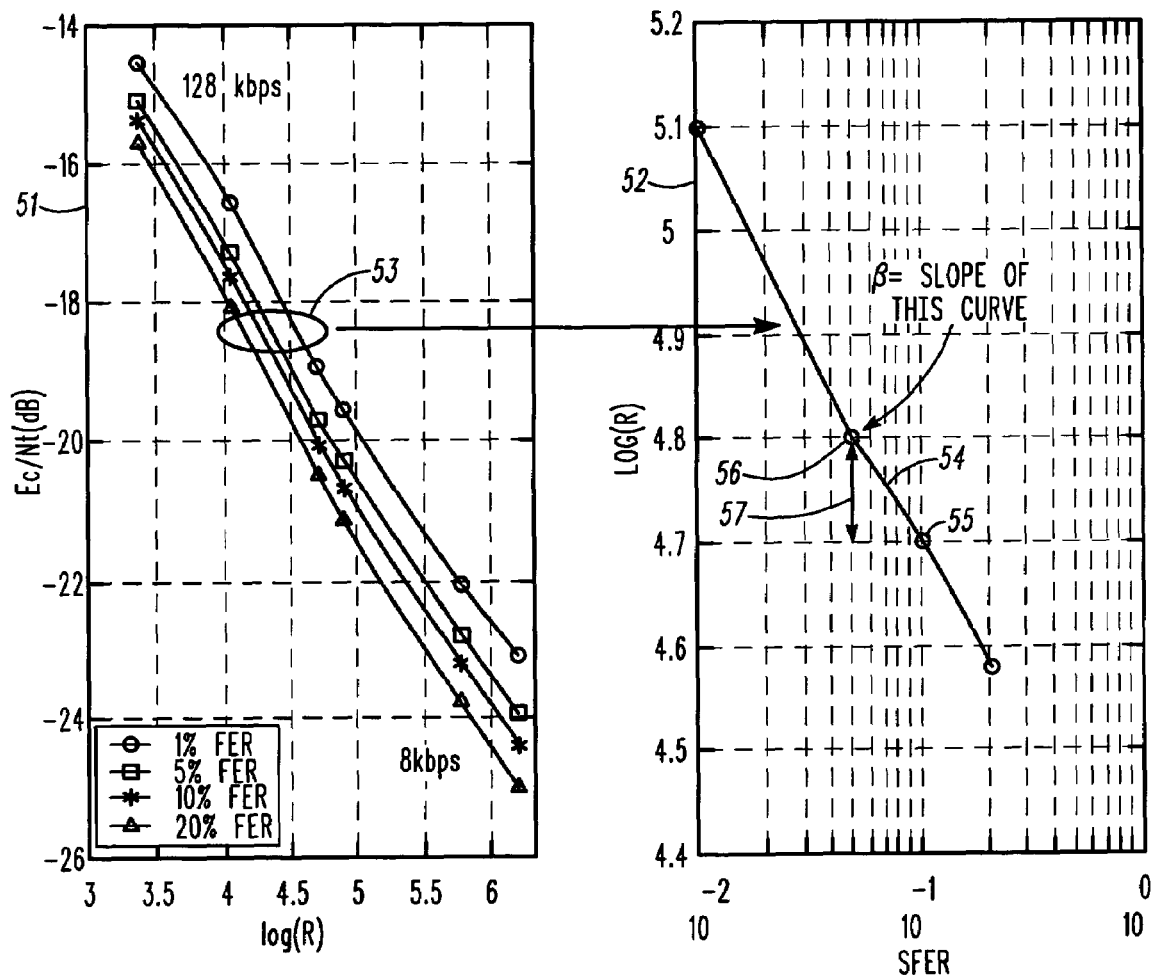
FIG. 5 comprises two graphs that illustrate certain aspects in accordance with an embodiment of the invention.

A parameter $\alpha_i$ is then determined 42 as follows. First, the processes uses the most stringent SFER requirement (presumed to be $SFER_1$ in this example) as the basis and sets $\alpha_1=1$. Then the process determines the rate required to achieve this requirement $SFER_1$ via the following equation:

$$\alpha_i = \beta \times \log\left(\frac{SFER_i}{SFER_1}\right)$$

for i from 2 to I. The parameter $\beta$ relates, as will be recalled from the discussion above, to the power level transmit energy as is accorded the data packet data channel. This value can be obtained from constant SFER curves such as those illustrated in FIG. 5. The graph 51 to the left in FIG. 5 depicts a number of frame error rate (FER) curves at various transmission rates wherein it can be seen that, as a general observation, the FER curves are substantially parallel to each other. As a result, it can be further observed that their relative differences tend to hold true regardless of the power ($E_c/N_t$). This, then, permits provision of a correlated curve 54 as shown by the graph 52 on the right side in FIG. 5. This curve 54 correlates to a given transmission power level 53 as denoted on the first graph 51 (which can itself correlate, for example, to the transmission power to be used when transmitting this message) and represents SFER versus log(R) (where R represents the processing gain).

It can be seen that the slope of this curve 54 corresponds to $\beta$. This slope $\beta$ permits one to determine the proportional change in the processing gain that will be required to achieve a particular SFER. Using this approach, it is possible to choose initial values that are within range of the optimal values regardless of channel conditions. For example, the point denoted by reference numeral 55 may represent an SFER level that is acceptable for a packet data service while the point denoted by reference numeral 56 may represent an SFER level that is appropriate for a voice service. This slope $\beta$ is used in the equation above to permit the calculation of $\alpha_i$.

The rate matching parameters to be used to establish a desired QoS for each service is then determined. The set of rate matching parameters for all services is as follows:

$$RM = \{RM_1, RM_2, \ldots, RM_I\} = \{\alpha_1 RM_1, \alpha_2 RM_1, \ldots, \alpha_I RM_1\}$$

where $\alpha_i, i \in \{1,2,3,\ldots,I\}$ is the proportional processing gain required to achieve $SFER_i$ for service i. The process solves 43 for $RM_1$ via $$\sum_{i=1}^{I} \alpha_i RM_1 = 1$$

and determines the other I-1 rate matching parameters via $RM_i = \alpha_i RM_1, i=\{2,3,\ldots,I\}$. (It may be appropriate in some settings to scale the rate matching parameters to conform to a stipulated range as may be otherwise mandated or suggested.)

The process then uses 44 the set $RM = \{RM_1, RM_2, \ldots, RM_I\}$ as the initial rate matching parameters for the call. When the power requirement to achieve the QoS for all services is known, the transmit chip energy may be set as:

$$E_c = \sum_{i=1}^{I} \left(\frac{N_i}{F_i} E_b^i R_i / N \times SF\right)$$

where $N_i$ and $F_i$ are the number of code symbols and radio frames per Transmission Time Interval (TTI), $R_i$ is the coding rate, SF is the spreading factor, $E_b^i$ is the required energy for service i, and N is the total number of symbols to be transmitted.

During the call, the outer-loop power control adjusts the target Signal-to-Interference Ratio (SIR) of the system. The resulting (measured) frame error rates are given 45 periodically subsequent to convergence of the outer-loop algorithm by $$SFER' = \{SFER'_1, SFER'_2, \ldots, SFER'_I\}$$

with $SFER'_1 \approx SFER_1$ due to the outer-loop power control.

At step 46, the process lets $\alpha'_1 = \alpha_1$. For $i = \{2, 3, \ldots, I\}$, if all the measured SFERs are within a certain range, that is:

$$SFER_i - \Delta \leq SFER'_i \leq SFER_i + \Delta$$

then $\alpha'_i = \alpha_i$ for $i = \{2, 3, \ldots, I\}$, and the previously determined rate matching parameters are confirmed as continuing to provide a desired level of performance. When such is not the case, however, the process adjusts β 47 via $$\beta' = \left[\frac{\sum_{i=2}^{I} \alpha_i}{\sum_{i=2}^{I} \log\left(\frac{SFER'_i}{SFER''_i}\right)}\right]$$

and computes $\alpha'_i$ 48 as follows $$\alpha'_i = \beta' \times \left(\frac{SFER'_i}{SFER_i}\right)$$

for $i = \{2, 3, \ldots, I\}$.

Using a new set of resultant parameters, $\{\alpha'_1, \alpha'_2, \ldots, \alpha'_I\}$, the process can re-compute the rate matching parameters (RM$_i$'s) via step 43 and issue a reconfiguration message to the receiver.

It can therefore be seen that, via these various embodiments, a desired level of quality-of-service for different communication services that share a common physical link, such as at least one spreading code, can be provided. This, in turn, both ensures services that meet user expectations while also avoiding over or under allocation of system resources to support requested services.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, as described, the base station determines the outer loop power control and the rate matching parameters to be used by the mobile station. It would be possible, however, to have either or both of these functions handled by the mobile station and/or to otherwise distribute such actions to or over other system components and participants.

We claim:

1. A method comprising:
   providing at least two communication services to be transmitted using at least one code division multiplexing code, wherein the at least two communication services comprise at least a first conunuicarion service to be transmitted pursuant to a first level of quality-of-service and a second communication service to be transmitted pursuant to a second level of quality-of-service;

selecting a given one of the communication services and using that given one of the communication services and a level of quality-of-service that corresponds to the given one of the communication services to govern outer loop power control during transmission of the at least two communication services using the at least one code division multiplexing code;

selecting rate matching parameters for each of the at least two communication services based on the rate matching (RM) parameters of the given one of the communication services according to:

$$\{RM_1, RM_2, \ldots, RM_I\} = \{\alpha_1 RM_1, \alpha_2 RM_1, \ldots, \alpha_1 RM_I\}$$

where I is the total number of communication services to be transmitted and $RM_1$ is the rate matching parameter for the given one of the communication services;

selecting a rate marching parameter ratio for service $_i$ of the at least two communication services ($\alpha_1$) according to:

$$\alpha_i = \beta \times \log\left(\frac{SFER_i}{SFER_1}\right)$$

where β is the power level transmit energy for a communication service and $SFER_i$ is the service frame error rate for service i of the at least two communication services and $SFER_1$ is the service frame rate for the given one of the communication services.

2. The method of claim 1 wherein providing at least two conununication services includes providing at least one of:
   a voice service and a data service;
   a first data service and a second data service.

3. The method of claim 1 wherein providing at least two communication services to be transmitted using at least one code division multiplexing code, wherein the at least two communication services comprise at least a first communication service to be transmitted pursuant to a first level of quality-of-service comprises using transmitted data error information to characterize the quality-of-service.

4. The method of claim 3 wherein using transmitted data error information to characterize the quality-of-service comprises using frame error rate information to characterize the quality-of-service.

5. The method of claim 1 wherein selecting a given one of the communication services comprises selecting a given one of the communications services that has a highest level of quality of service as compared to others of the at least two communications services.

6. The method of claim 5 wherein selecting a given one of the communications services further comprises ordering the communications services in order of highest level of quality-of-service to a lowest level of quality-of-service.

7. The method of claim 1 wherein selecting a rate matching parameter ratio includes using the rate matching parameter ratio to allocate transport channel sizes to be used to transmit the communication services.

8. The method of claim 7 wherein allocating transport channel sizes comprises at least one of:
increasing a quantity of transmitted symbols as corresponds to at least one of the communication services; and
decreasing a quantity of transmitted symbols as corresponds to at least one of the communication services.

9. The method of claim 1 wherein deternting a rate matching parameter ratio comprises determining a proportional processing gain for at least some of the communication services.

10. The method of claim 9 wherein determining a proportional processing gain for at least some of the communication services comprises determining a proportional processing gain for each of the communication services other than the given one of the communication services.

11. The method of claim 1 and farther comprising selecting a transmit energy level.

12. The method of claim 11 wherein selecting a transmit energy level comprises determining power requirements to likely achieve each of the preferred levels of quality-of-service and determining the transmit energy level as a function of the power requirements.

13. The method of claim 12 wherein determining the transmit energy level as a function of the power requirements includes determining transmit energy level $E_c$ as a function of:

$$E_c = \sum_{i=1}^{I} \left( \frac{N_i}{F_i} E_b^i R_i / N \times SF \right)$$

where $N_i$ and $F_i$ represent a number of code symbols and radio frames per Transmission Time Interval, $R_i$ represents a coding rate, SF represents a spreading factor, $E_b^i$ represents required energy for service i, and N represents a total number of symbols to be transmitted.

14. The method of claim 1 further comprising modifying at least some of the rate matching parameters during transmission of the communication services using the common code division multiplexing code.

15. The method of claim 14 and further comprising receiving information regarding substantially current channel conditions and wherein modifying at least some of the rate matching parameters during transmission of the communication services comprises modifying at least some of the rate matching parameters during transmission of the communication services as a function, at least in part, of the current channel conditions.

16. The method of claim 14 further comprising storing at least some information that corresponds to modifications of the rate matching parameters and using the information to determine rate matching parameters to support a subsequent communication session.

17. An apparatus to provide a desired level of quality-of-service for each of a plurality of communication services that are to be transmitted using a common code division multiplexing code, comprising:

input means for receiving at least:
first data that corresponds to a first communication service having a first corresponding desired level of quality-of-service; and
second data that corresponds to a second communication service having a second corresponding desired level of quality-of-service;
selection means for selecting a particular one of the first data and the second data to provide selected data;
outer loop power control means to effect outer loop power control during trasmision of the plurality of communication services using the desired level of quality-of-service that corresponds to the selected data;
rate matching parameter selection means for determining a rate matching (RM) parameter for each of the communication services based on the rate matching parameter of the narticular one of the first data and the second data according to:

$\{RM_1, RM_2, \ldots, RM_I\} = \{\alpha_1 RM_1, \alpha_2 RM_1, \ldots, \alpha_I RM_I\}$ where $_I$ is the total number of communication services to be transmitted and $RM_1$ is the rate matching parameter for the selected data and where a rate matching parameter ratio for service $_i$ of the plurality of communication services $(\alpha_i)$ according to:

$$\alpha_i = \beta \times \log\left(\frac{SFER_I}{SFER_i}\right)$$

and where β is a constant that relates processing gain of the plurality of communication services to service frame error rate and $SFER_i$ is the service frame error rate for service i of the at least two communication services and $SFER_1$ is the service frame rate for the given one of the communication services. is the service frame error rate for the communication service.

18. The apparams of claim 17 wherein the rate matching parameter selection means determines a rate matching parameter ratio substantially independently of transmission energy factors.

19. The apparatus of claim 18 wherein the selection means selects a particular one of the first and second data that has a highest corresponding quality-of-service.

20. The apparatus of claim 17 and further comprising transmission energy selection means for selecting a transmission energy level to use when transmitting the communication services.

21. The apparatus of claim 17 and further comprising rate matching parameter modification means for modifying at least some of the rate matching parameters subsequent to determining the rate matching parameters.

22. The apparatus of claim 21 wherein modifying at least some of the rate matching parameters includes modifying a rate matching parameter ratio.

23. A method comprising:
providing at least two communication services to be transmitted using at least one code division multiplexing code, wherein the at least two communication services comprise at least a first communication service to be transmitted pursuant to a first level of quality-of-service and a second communication service to be transmitted pursuant to a second level of quality-of-service;

selecting a given one of the communication services and using that given one of the communication services and a level of quality-of-service that corresponds to the given one of the communication services to govern outer loop power control during transmission of the at least two communication services using the at least one code division multiplexing code;

selecting rate matching parameters for each of the at least two communication services independently of transmission energy factors;

selecting a transmit energy level;

determining power requirements to likely achieve each of the preferred levels of quality-of-service determining the transmit energy level as a function of the power requirements including determining transmit energy level $E_c$ as a function of:

$$E_c = \sum_{i=1}^{I} \left( \frac{N_i}{F_i} E_b^i R_i / N \times SF \right)$$

where I is the total number of communication services transmitted, $N_i$ and $F_i$ represent a number of code symbols and radio frames per Transmission Timer Interval $R_i$ represents a coding rate, SF represents a spreading factor, $E_i^b$ represents required energy for service $_i$ of the at least two communication services and N represents a total number of symbols to be transmitted.

* * * * *